(12) United States Patent
Zettel et al.

(10) Patent No.: US 6,459,226 B1
(45) Date of Patent: Oct. 1, 2002

(54) METHOD AND APPARATUS FOR ACCURATE POWERED DECELERATION AND IMMOBILIZATION OF MANUALLY OPERATED MECHANISM

(75) Inventors: Ignatius M. Zettel, New Berlin; Jonathan C. Boomgaarden, Waukesha, both of WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/754,473

(22) Filed: Jan. 4, 2001

(51) Int. Cl.$^7$ ................................................ G05B 11/01
(52) U.S. Cl. ........................ 318/560; 318/567; 318/569; 318/9; 318/600
(58) Field of Search ................................ 318/560, 567, 318/569, 9, 600

(56) References Cited

U.S. PATENT DOCUMENTS

| | | | | |
|---|---|---|---|---|
| 4,516,063 A | * | 5/1985 | Kaye et al. | 318/685 |
| 6,012,396 A | * | 1/2000 | Schulz | 105/72.2 |
| 6,282,264 B1 | * | 8/2001 | Smith et al. | 378/189 |
| 6,293,837 B1 | * | 9/2001 | Forster | 198/377.02 |
| 6,322,065 B1 | * | 11/2001 | Underwood et al. | 271/117 |

* cited by examiner

Primary Examiner—Karen Masih
(74) Attorney, Agent, or Firm—McAndrews, Held & Malloy, Ltd.; Peter J. Vogel; Michael A. Dellapenna

(57) ABSTRACT

An electronic detent apparatus and method for simulating a mechanical detent comprises a sensor connected to a microprocessor. A servo-motor is connected to the microprocessor and has a motor drive connected to a clutch. The clutch may engage a wheel disposed upon a rail or surface to effect the simulation of a mechanical detent through the microprocessor controlled servo-motor. The method for simulating a mechanical detent comprises the steps of moving an axis and monitoring the position and velocity of the axis. The position and velocity of the axis is then compared to a pre-specified position threshold value and a pre-specified velocity threshold value using a microprocessor disposed on the axis. A servo-motor is activated to accelerate the axis to a pre-specified position using a clutch controlled by the servo-motor when the position and velocity of the axis exceed the pre-specified position and velocity threshold values. Prior to engaging the clutch, the servo-motor drive speed is adjusted to nearly match the speed of the axis. The clutch operates on a wheel that is connected to the clutch and that is disposed upon a rail. The step of monitoring the position and velocity of the axis may be limited to monitoring only the position or velocity of the axis depending on the desired control characteristics of the electronic detent.

22 Claims, 5 Drawing Sheets

METHOD AND APPARATUS FOR ACCURATE POWERED DECELERATION AND IMMOBILIZATION OF MANUALLY OPERATED MECHANISM

BACKGROUND OF THE INVENTION

This invention is directed to an electronic detent apparatus and method for simulating the effect of a mechanical detent. The use of mechanical detents to position mechanical apparatus is well known in the art and are used in a variety of applications, including in conjunction with positioning radiographic equipment.

In radiographic procedures it is frequently necessary for an operator to manually position an x-ray assembly (i.e., a movable axis or movable assembly) to a previously specified precise position or configuration. For example, it is common to position the focal spot of the x-ray device about 1 meter above the receptor plane, with the focal spot centered front to rear and side to side relative to the receptor plane and with the centerline of the collimating device aligned with a line from the center of the receptor to the focal spot. To do this, mechanical locating features have been previously used to provide the operator with an indication that he is approaching the previously specified location. These prior mechanical locating features hold the assembly or movable axis in the specified location and return the assembly or movable axis to the specified location if moved a small distance. These mechanical locating features were and are commonly referred to as detents. The assembly or movable axis can be fixed at multiple pre-specified locations through the use of multiple mechanical detents.

Past mechanical detents came in many variations. The most common designs included the use of a spring-loaded roller (or plunger) which operated on a surface having grooves or recesses. Movement of the movable axis caused relative motion between the spring-loaded roller and the surface, with the spring-loaded roller engaging the groove or recess at a pre-specified position. Engaging the groove or recess brought the movable axis to a stop at the pre-specified location within the groove or recess. As the spring-loaded roller engaged the groove or recess, the operator experienced a "pull" as the roller accelerated into the groove or recess. The feel of being pulled into the detent provided the operator with tactile feedback as to whether the detent had been reached. This type of mechanical detent design is common to many other types of equipment, including automotive gear shift levers.

Alternatively, prior detent designs could use magnets physically attached to a rail. A circuit board containing Hall effect sensors would activate an electronic switch to bring the movable assembly to a stop when the circuit board was passed by the magnet(s) physically attached to the rail. The magnets in this alternative prior mechanical detent design were physically affixed to the rail in the same manner as the previously discussed mechanical ramps.

The disadvantages associated with these prior mechanical detents were numerous. For example, adjusting the detenting force was difficult because the detent was a physical object (e.g., a steel wedge), or had a fixed property (e.g., a fixed magnetic field) that was difficult to change. Adjusting or changing the detenting positions was difficult because the mechanical detent had to be physically moved. Adding or removing mechanical detenting positions was very difficult. Also, mechanical detents were unreliable, wore out, and cost money. Finally, it was often difficult to find enough space for multiple mechanical detents, which resulted in additional design time as well as designs that were bulkier than they would be otherwise.

Therefore, a need has long existed for a new and improved detent apparatus and method that overcomes the difficulties associated with past mechanical detents.

BRIEF SUMMARY OF THE INVENTION

In a preferred embodiment of the invention, the electronic detent apparatus includes a sensor connected to a microprocessor. A servo-motor is connected to the microprocessor and has a motor drive connected to a clutch. The clutch may engage a wheel disposed upon a rail or surface to effect the simulation of a mechanical detent through the microprocessor controlled servo-motor.

In a preferred embodiment of the invention, a method for simulating a mechanical detent comprises the steps of moving an axis and monitoring the position and velocity of the axis. The position and velocity of the axis is then compared to a pre-specified position threshold value and a pre-specified velocity threshold value using a microprocessor disposed on the axis. A servo-motor is activated to accelerate the axis to a pre-specified position using a clutch controlled by the servo-motor when the position and velocity of the axis exceed the pre-specified position and velocity threshold values. The servo-motor drive speed is adjusted to nearly match the speed of the axis before the clutch is engaged. The clutch operates on a wheel connected to the clutch and disposed upon a rail. In an alternative embodiment of the invention, the step of monitoring the position and velocity of the axis may be limited to monitoring only the position or velocity of the axis depending on the desired control characteristics.

The preferred embodiment of the electronic detent apparatus and method has a number of advantages. First, the number of detents can be easily changed by adding pre-specified position and/or velocity threshold values to the microprocessor. Second, the location of the detent(s) can be easily changed by altering the pre-specified position and/or velocity threshold values. Third, because the detent(s) are electronic they occupy negligible space, unlike mechanical detents, thereby reducing detent device size and design times. Fourth, the method of the present invention provides great flexibility in positioning and changing the number of detents. Sixth, the use of an electronic detent allows for numerous detent characteristics (such as, for example, detent length and "pull force" experienced) to be varied in a virtually limitless number of ways, e.g., either in a pre-specified manner or continuously. Other features and advantages of the invention will become apparent from the description that follows.

BRIEF DESCRIPTION OF THE DRAWINGS

Additional objects and features of the invention will appear from the following description in which the preferred embodiments are set forth in conjunction with the accompanying drawings.

DETAILED DESCRIPTION OF THE INVENTION

Figure 1:
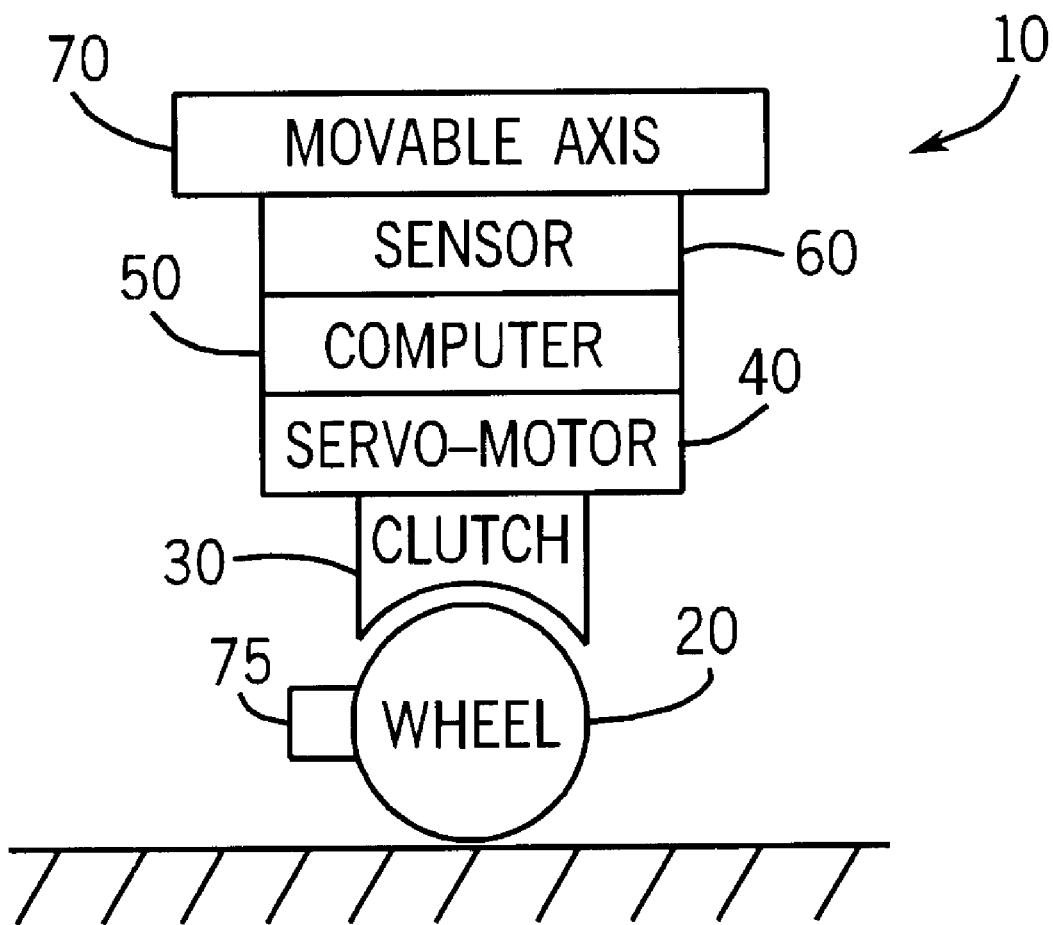
FIG. 1 illustrates one embodiment of the electronic detent apparatus of the present invention.

Turning to FIG. 1, one embodiment of an electronic detent apparatus 10 is illustrated. The electronic detent apparatus 10 includes a wheel 20 connected to a clutch 30. A servo-motor 40 is attached to the clutch 30. A programmable microprocessor 50 is connected to the servo-motor 40. A sensor 60 is connected to the programmable microprocessor 50. The wheel 20, the clutch 30, the servo-motor 40, the programmable microprocessor 50, and the sensor 60 comprise an electronic detent 10 which simulates electronically the properties and function of prior mechanical detents. A movable axis 70 is connected to the electronic detent 10 in a manner suitable for effecting the desired deceleration and immobilization characteristics. The physical arrangement or configuration of the clutch 30, the servo-motor 40, the programmable microprocessor 50 and the sensor 60 may be varied without detracting from the present invention so long as the ability to effect an electronic detent is maintained. The electronic detent apparatus 10 of the present invention is particularly suitable for use in conjunction with radiographic medical equipment. In one alternative embodiment, the clutch 30 may be connected to the movable axis 70 via the servo-motor 40 using a variety of alternative well known mechanical connections (i.e., besides a wheel), depending on the needs of the specific design implementation. These alternative mechanical connections include the use of a timing belt, a chain, a ball screw, a gear and rack, or a wheel and track.

Figure 2:
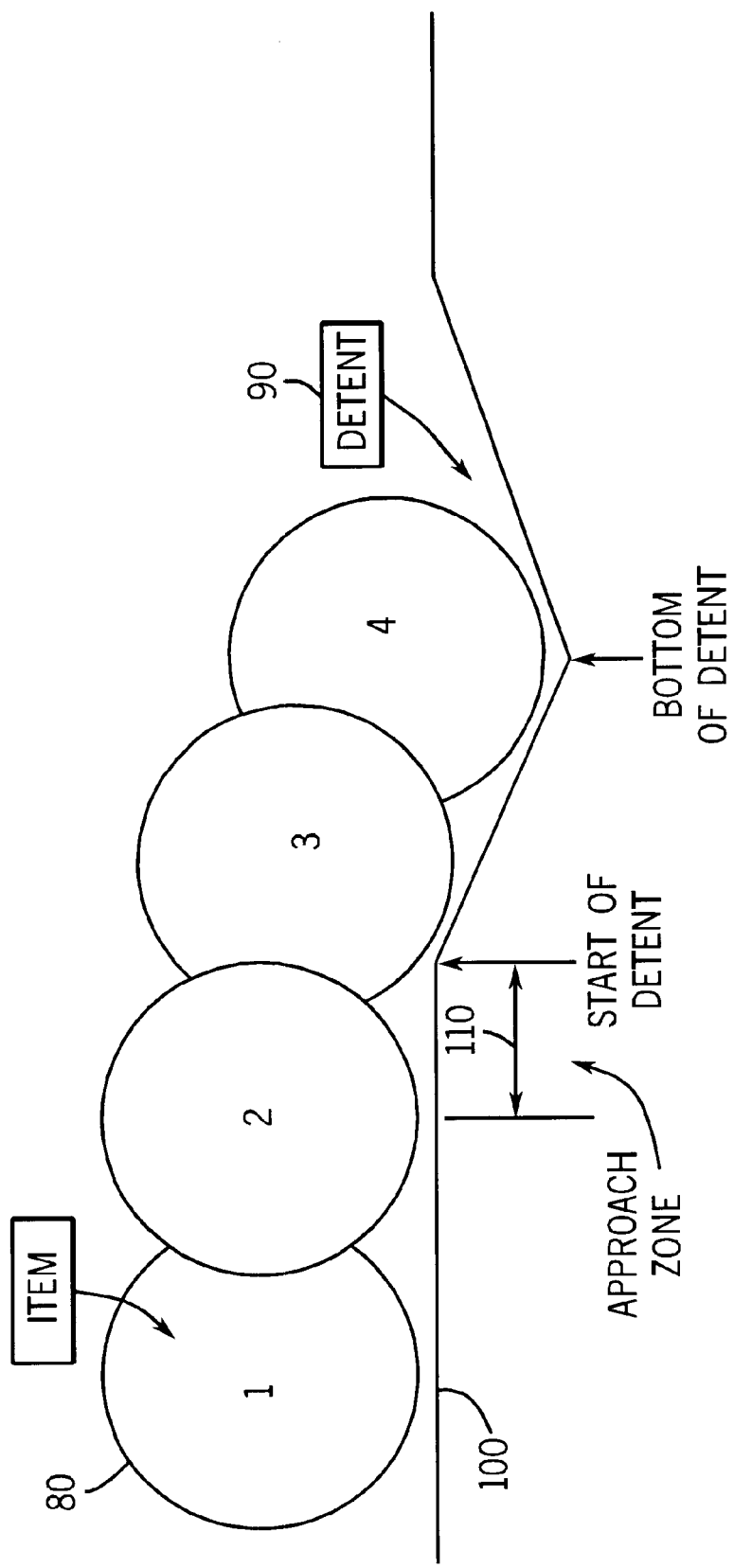
FIG. 2 illustrates one embodiment of the electronic detent apparatus of the present invention.

Turning to FIG. 2, one embodiment of the electronic detent apparatus of the present invention is graphically illustrated. An item 80 (e.g., the movable axis 70) is moved toward a detent 90 over a flat surface 100 by applying a steady force to move the item 80 over the flat surface 100. FIG. 2 illustrates the item 80 at four distinct locations of the detent 90. When the item 80 reaches an approach zone 110, the electronic detent apparatus 10 matches the servo-motor 40 drive velocity to the item 80 velocity and engages the clutch 30 to take over motion of the item 80. The engaged electronic detent apparatus provides the operator with "a pulling feel" as the item 80 accelerates towards and comes to rest in the detent 90. The pulling feel experienced by the operator is effected by programming the programmable microprocessor 50 in a manner well understood to those skilled in the art. More specifically, the programmable microprocessor 50 activates the servo-motor 40 and the clutch 30 of the electronic detent apparatus 10 in a pre-specified manner to simulate a detent.

For example, the desired deceleration and immobilization characteristics may be achieved by programming the programmable microprocessor 50 with pre-specified position and velocity threshold values. If the actual velocity or position of the movable axis 70 exceeds the pre-specified position or velocity threshold values the servo-motor 40 is energized so that the servo-motor 40 drive speed nearly matches the speed of the movable axis 70. The speed need not be matched exactly. The servo-motor 40 may be energized by applying a voltage to the servo-motor 40 which gives a speed which is close to the desired speed. The objective is to minimize the speed difference between the servo-motor 40 drive speed and the movable axis 70. Once the servo-motor 40 is energized, the clutch 30 is engaged so that the servo-motor 40 drive is connected to the movable axis 70. Current is applied to the servo-motor 40 in such a direction as to move the movable axis 70 toward the detent position 90. The current will reverse direction if the movable axis 70 position passes through the detent 90. Also, when the movable axis 70 is within some pre-determined value of the detent position 90, and the movable axis 70 velocity is below some threshold value (i.e., the movable axis 70 is "in" the detent 90), the current to the servo-motor 40 is reduced or turned off. Once the movable axis 70 is positioned in the detent 90 a brake or lock 75 may be applied to hold the movable axis 70 in position.

In an alternative embodiment, when the movable axis 70 is moved away from the detent position 90 (either passing through or returning in the direction it came from), to the extent that it exceeds a predetermined position or velocity value the clutch 30 is disengaged and the servo-motor 40 is turned off. Other electronic logic conditions may be used to define when the movable axis 70 is "in" the detent position without detracting from the present invention. Moreover, other methods of keeping the movable axis 70 in the detent position 90 may be implemented (e.g., the servo-motor 40 may be left on or may turn off on a timer, the clutch 30 may be disengaged, etc.). The use of other types of motors or actuating devices will change the details for implementing the present invention only slightly in a manner well known to those skilled in the art.

In an alternative embodiment, the programmable microprocessor 50 may have logic applied such that the electronic detent 10 is activated only if the movable axis 70 velocity is within a certain predetermined range. This would be useful to prevent the detent 90 from engaging if the movable axis 70 speed is greater than the maximum speed of the servo-motor 40 drive, or if the speed is such that it would be unreasonable to expect that the operator would wish to stop at the detent 90.

In an alternative embodiment, the programmable microprocessor 50 may be programmed such that programmable microprocessor 50 adjusts the pre-determined position value relative to the detent position 90 based on the velocity of the movable axis 70. This may be useful in giving the operator the proper feel for the detent 90.

In an alternative embodiment, the programmable microprocessor 50 may be programmed such that for a certain range of movable axis 70 velocities the servo-motor 40 drive applies a force which opposes the movable axis 70 motion as the movable axis 70 position approaches the detent position 90. This creates the effect of a wider detent 90.

Figure 3:
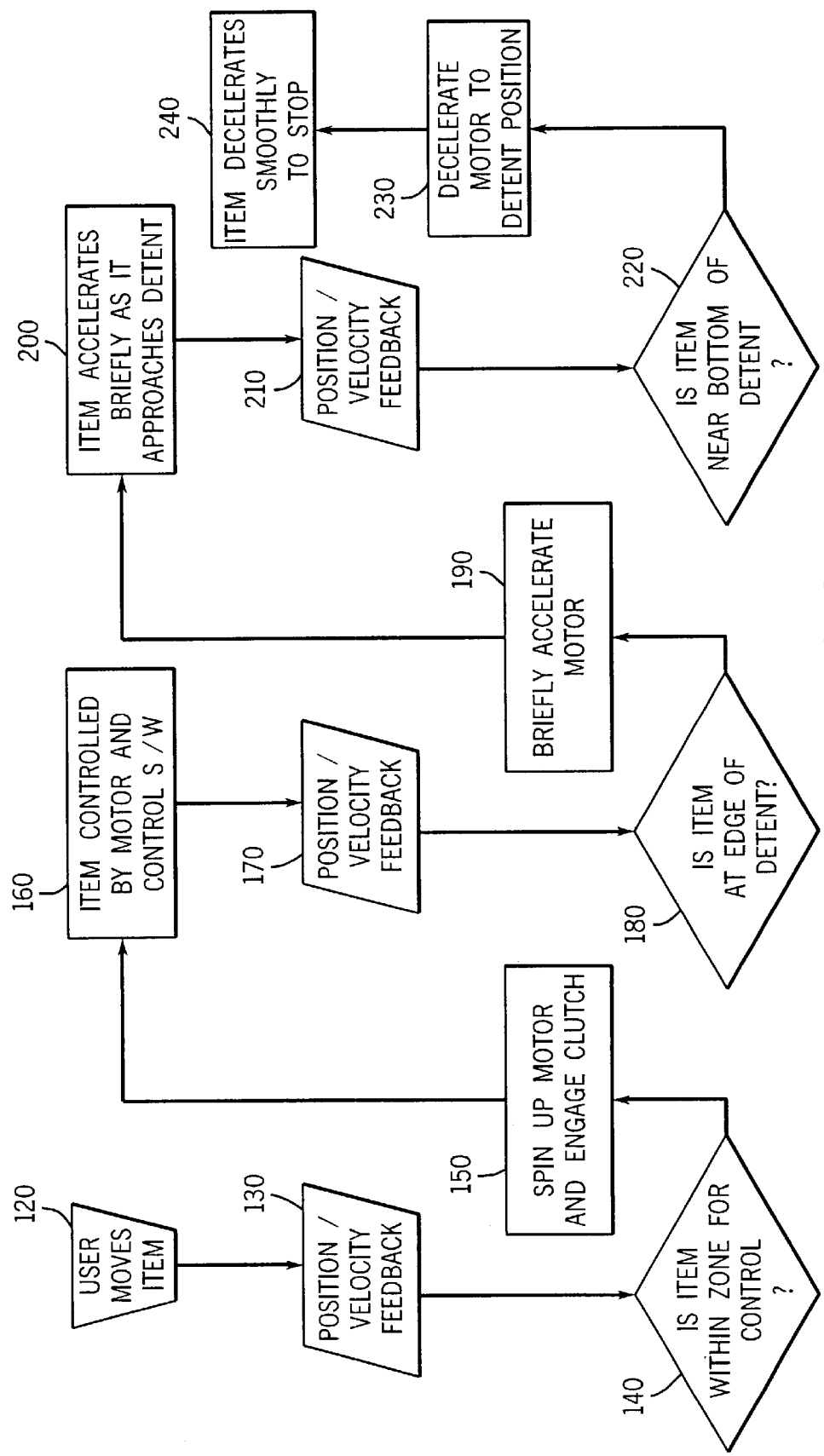
FIG. 3 illustrates the method of one embodiment of the electronic detent apparatus of the present invention.

Turning to FIG. 3, one embodiment of the method of the present invention for simulating a mechanical detent is illustrated. A user moves an item 120 and obtains position and velocity feedback 130. If the item is within the zone for control 140 the motor is activated and the clutch engaged 150. The item is controlled by a motor and control switch 160 and obtains position and velocity feedback 170. If the item is at the edge of the detent 180 the motor is then briefly accelerated 190. The item accelerates briefly as it approaches the detent 200 and obtains further position and velocity feedback 210. If the item is near the bottom of the detent 220 the motor is decelerated to the detent position 230 and brings the item smoothly to a stop 240.

Figure 4:
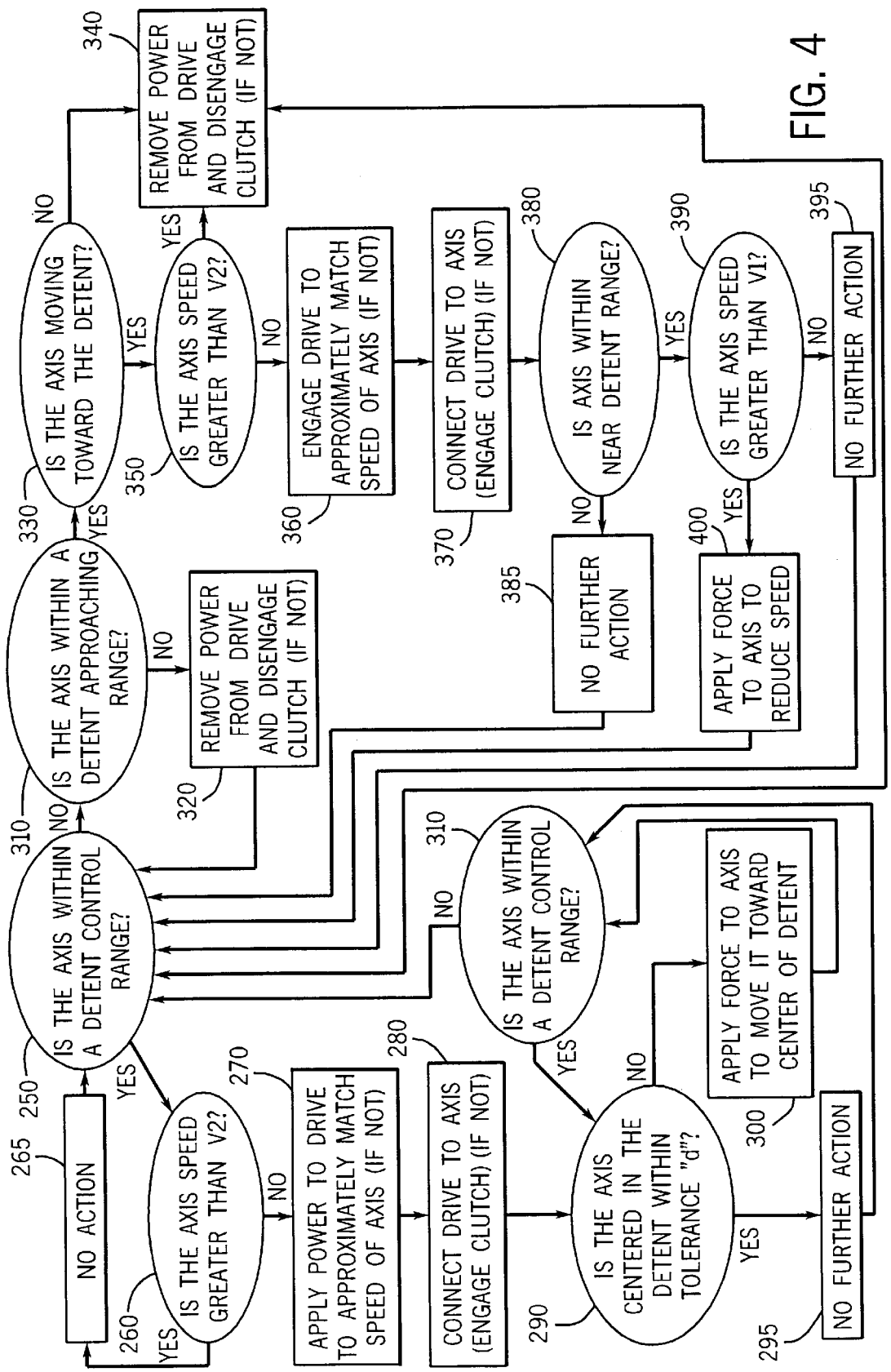
FIG. 4 illustrates the method of one embodiment of the electronic detent apparatus of the present invention.

Turning to FIG. 4, one embodiment of the method of the present invention for simulating a mechanical detent is illustrated. The method comprises the steps of determining whether the movable axis is within a detent control range 250. The detent control range refers to the region around the detent location 90 within which the servo-motor 40 drive will drive the movable axis 70 toward the detent position 90. If the movable axis is within the detent control range 250, the electronic detent 10 determines whether the movable axis speed is greater than V2 260. Speed V2 is a speed which represents the highest speed at which the operator is expected to wish to stop in the detent 90. If the movable axis speed is greater than V2 260, no further action is taken 265 and the electronic detent 10 continues to monitor whether the movable axis is within a detent control range 250. If the movable axis speed is not greater than V2 260 the electronic detent 10 applies power to the servo-motor 40 drive to approximately match the speed of the movable axis 270 and connects the servo-motor drive to the movable axis through the clutch 280 if not already engaged. The electronic detent 10 then determines whether the movable axis is centered in the detent within a tolerance "d" 290. (When the movable axis position is within "d" of the pre-specified detent position, the electronic detent 10 is "in detent." This tolerance may be arbitrarily small.) If it is within the tolerance "d" 290, no further action is taken 295 and the electronic detent 10 continues to monitor whether the movable axis is within a detent control range 250. If it is not, the electronic detent 10 applies a force to the movable axis to move it toward the center of the detent 300. If the movable axis is within the detent control range 310 the electronic detent 10 determines whether the movable axis is centered within the detent within a tolerance "d" 290. If the movable axis is centered within a tolerance "d" 290, no further action is taken 295 and the electronic detent 10 continues to monitor whether the movable axis is within a detent control range 250. If the movable axis is not centered within a tolerance "d" 290, the electronic detent continues to apply a centering force to the movable axis 300 until it is appropriately centered.

If the movable axis is not within a detent control range 250, the electronic detent 10 determines whether the movable axis is within a detent approaching range 310. The detent approaching range refers to a region around the detent location larger than the detent control range. While in the detent approaching range (e.g., between speeds V1 and V2), the servo-motor 40 drive attempts to slow the movable axis down. The detent approaching range is used to slow the movable axis down as the detent control range is approached. If the movable axis is not within a detent approaching range 310, the electronic detent 10 removes power from the servo-motor 40 drive and disengages the clutch if not already disengaged 320. The electronic detent 10 then continues to monitor whether the movable axis is within a detent control range 250.

If the movable axis is within a detent approaching range 310 the electronic detent 10 determines whether the movable axis is moving toward the detent 330. If it is not, power is removed from the servo-motor 40 drive and the clutch 30 is disengaged if not already disengaged 340. The electronic detent 10 then continues to monitor whether the movable axis is within a detent control range 250.

If the movable axis is moving toward the detent 330 the electronic detent 10 determines whether the movable axis speed is greater than V2 350. If it is, power is removed from the servo-motor 40 drive and the clutch 30 is disengaged if not already disengaged 340. The electronic detent 10 then continues to monitor whether the movable axis is within a detent control range 250.

If the movable axis speed is not greater than V2 350 the electronic detent 10 engages the servo-motor 40 drive to approximately match the speed of the movable axis if not already matched 360. The servo-motor 40 drive is connected to the movable axis through the clutch 30 if not already engaged 370. The electronic detent then determines whether the movable axis is within the near detent range 380. If it is not, no further action is taken 385 and the electronic detent 10 continues to monitor whether the movable axis is within a detent control range 250. If the movable axis is within the near detent range 380, the electronic detent 10 determines whether the movable axis speed is greater than V1 390. V1 is a speed which represents an operator moving the movable axis 70 slowly so as to find the detent 90 without passing through it. If the movable axis speed is not greater than V1 390, no further action is taken 395 and the electronic detent continues to monitor whether the movable axis is within a detent control range 250. If the movable axis speed is greater than V1 390, the electronic detent applies a force to the movable axis to reduce the speed of the axis 400. The electronic detent 10 then continues to monitor whether the movable axis is within a detent control range 250. In this manner, FIG. 4 illustrates diagrammatically how one embodiment of the method of the electronic detent of the present invention may be practiced.

Figure 5:
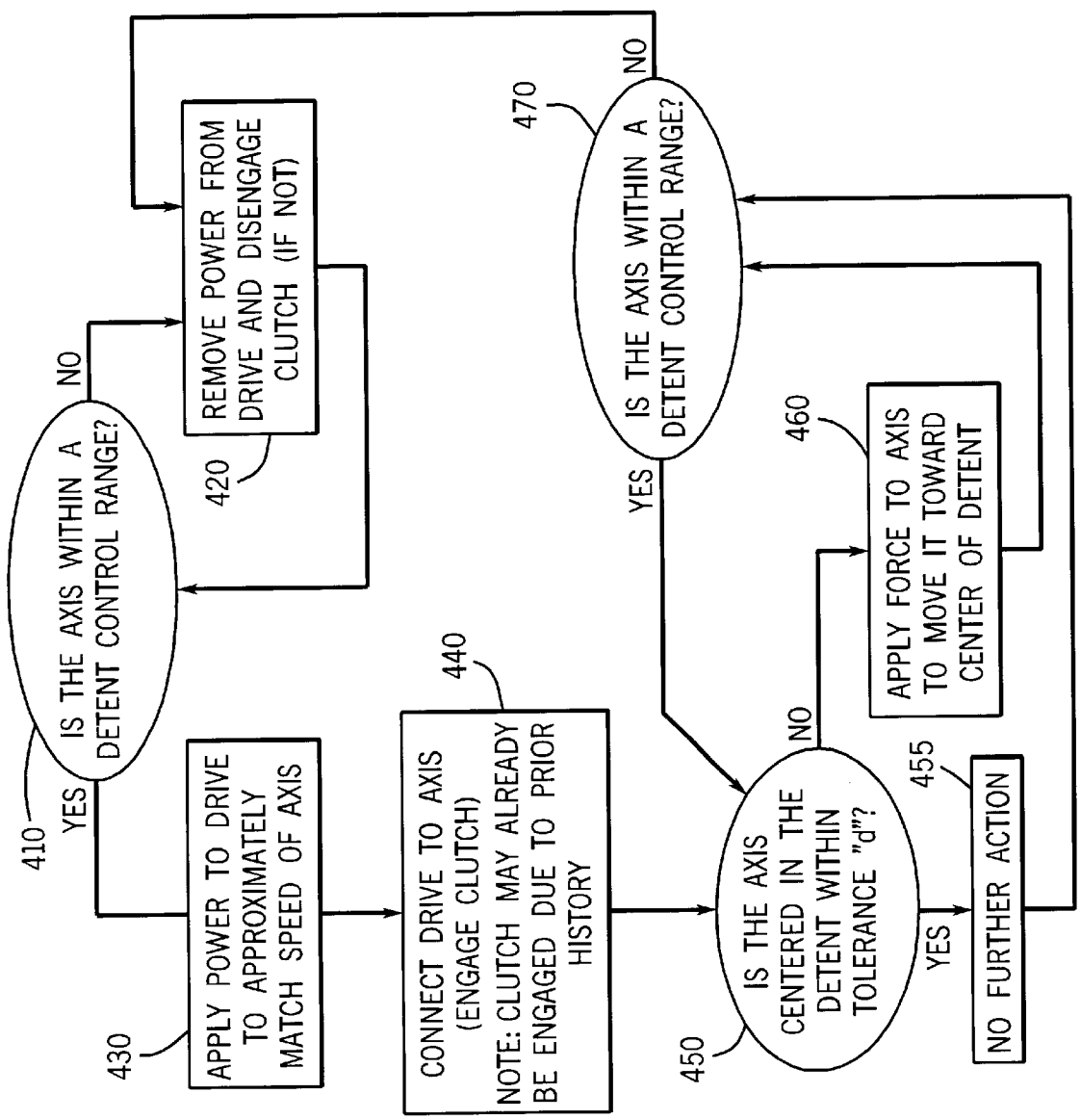
FIG. 5 illustrates the method of one embodiment of the electronic detent apparatus of the present invention.

Turning to FIG. 5, one alternative embodiment of the method of the present invention for simulating a mechanical detent is illustrated. The electronic detent 10 determines whether the movable axis is within a detent control range 410. If it is not, power is removed from the servo-motor 40 drive and the clutch 30 is disengaged if not already 420. The electronic detent 10 then continues to monitor whether the movable axis is within a detent control range 410.

If the movable axis is within a detent control range 410, the electronic detent 10 applies power to the servo-motor 40 drive to approximately match the speed of the movable axis 430. The servo-motor 40 drive is then connected to the movable axis by engaging the clutch 30 if not already engaged 440. The electronic detent 10 then determines whether the movable axis is centered in the detent with a tolerance "d" 450. If it is, no further action is taken 455 and the electronic detent continues to monitor whether the movable axis is within a detent control range 410. If the movable axis is not centered within a tolerance "d" 450, the electronic detent 10 applies a force to the movable axis to move it toward the center of the detent 460. The electronic detent 10 then determines whether the movable axis is within a detent control range 470. If the axis is not within the detent control range 470, power is removed from the servo-motor 40 drive and the clutch 30 is disengaged if not already 40. The electronic detent 10 continues to monitor whether the movable axis is within a detent control range 410.

If the movable axis is within a detent control range 470 after a force is applied to the movable axis to move it toward the center of the detent 460, the electronic detent 10 determines again whether the movable axis is centered in the detent within a tolerance "d" 450. If it is, no further action is taken 455. If it is not, force is applied to the movable axis to move it toward the center of the detent 460. In this manner, the electronic detent 10 continues to apply a centering force to the movable axis until it is centered within the detent within a tolerance "d" 450 or until the movable axis is no longer within a detent control range 470.

In one embodiment, at speeds greater than V2, the electronic detent function does not affect the operation of the system. This is useful where it is clear based on the movable axis speed that the operator does not wish to use the detent functions, e.g., where the operator wishes to quickly move radiographic equipment in an emergency situation. In an alternative embodiment, the electronic detent 10 may be provided with a "detent" switch which when "OUT" or "OFF" disables the electronic detent function and which when "IN" or "ON" enables the electronic detent function.

The present invention thereby provides an electronic detent 10 and method for simulating a mechanical detent.

The invention uses a servo-motor 40 activated clutch 30 to alter the wheel 20 velocity in a manner that simulates the feel of engaging a mechanical detent. The servo-motor 40 is activated when a programmable microprocessor 50 determines, based on velocity and position information, that a pre-specified detent position 90 is being approached. The feel of approaching a detent location 90 is simulated by programming the programmable microprocessor 50 with threshold velocity and position values in a manner that is well known in the art. Prior limitations associated with mechanical detents are, thus, eliminated.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. An electronic detent comprising:
   a sensor;
   a microprocessor connected to the sensor;
   a servo-motor connected to the microprocessor;
   a clutch connected to the servo-motor; and
   a wheel connected to the clutch wherein the wheel is disposed upon a rail.

2. The electronic detent of claim 1 wherein the sensor is either a potentiometer or an encoder.

3. The electronic detent of claim 1 wherein the servo-motor comprises a shunt wound DC motor.

4. The electronic detent of claim 1 wherein the wheel is a roller.

5. The electronic detent of claim 1 wherein the wheel is a bearing.

6. The electronic detent of claim 1 wherein the sensor is programmed to detect position and velocity values.

7. An electronic detent for use with radiographic equipment comprising:
   a movable axis;
   a sensor connected to the movable axis;
   a microprocessor connected to the sensor;
   a servo-motor connected to the movable axis;
   a clutch connected to the servo-motor; and
   a wheel connected to the clutch wherein the wheel is disposed upon a rail.

8. The electronic detent of claim 7 wherein the sensor is either a potentiometer or an encoder.

9. The electronic detent of claim 7 wherein the movable axis comprises a device for radiographic imaging.

10. A method for simulating a mechanical detent comprising the steps of:
    moving an axis;
    monitoring the position and velocity of the axis;
    comparing the position and velocity of the axis to a pre-specified position threshold value and a pre-specified velocity threshold value using a microprocessor disposed on the axis;
    activating a servo-motor to accelerate the axis to a pre-specified position using a clutch controlled by the servo-motor when the position and velocity of the axis exceed the set of pre-specified position and velocity threshold values wherein the clutch operates on a wheel connected to the clutch and wherein the wheel is disposed upon a rail.

11. The method of claim 10 wherein the position and velocity of the axis are monitored using a sensor.

12. The method of claim 11 wherein the sensor is either a potentiometer or an encoder.

13. The method of claim 11 wherein the sensor is disposed on the axis.

14. The method of claim 10 wherein the axis comprises a device for radiographic imaging.

15. The method of claim 10 wherein the position and velocity of the axis are monitored continuously.

16. The method of claim 10 wherein the servo-motor is first energized so that the servo-motor drive speed matches the speed of the axis before the clutch is engaged.

17. The method of claim 10 comprising the additional step of disengaging the clutch from the wheel and engaging a brake to maintain the axis in the pre-specified position.

18. The method of claim 10 wherein the pre-specified velocity threshold value corresponds to a maximum velocity value indicative of a desire not to stop at the pre-specified position.

19. The method of claim 10 wherein the pre-specified position threshold value is varied by the microprocessor depending on the velocity of the axis.

20. A method for simulating a mechanical detent comprising the steps of:
    moving an axis;
    monitoring the position of the axis using a sensor;
    comparing the position of the axis to a pre-specified position threshold value using a microprocessor disposed on the axis;
    activating a servo-motor to accelerate the axis to a pre-specified position using a clutch controlled by the servo-motor when the position of the axis exceeds the pre-specified position threshold value wherein the clutch operates on a wheel connected to the clutch and wherein the wheel is disposed upon a rail.

21. The method of claim 20 comprising the additional step of monitoring the velocity of the axis and disengaging the clutch when the velocity exceeds a pre-specified velocity threshold value.

22. The method of claim 20 wherein the step of activating the servo-motor to accelerate the axis to the pre-specified position comprises the additional step of disengaging the clutch after a brake connected to the wheel is activated.

* * * * *